US007661598B2

(12) United States Patent
Muraoka et al.

(10) Patent No.: US 7,661,598 B2
(45) Date of Patent: Feb. 16, 2010

(54) MECHANISM FOR ATTACHING RFID TAG, TRANSFER DEVICE AND TRANSFER SYSTEM USING RFID TAG

(75) Inventors: Yoshitaka Muraoka, Kawasaki (JP); Tomohiko Maeda, Kawasaki (JP); Kazuo Sato, Kawasaki (JP); Hidehiko Fuchida, Kawasaki (JP); Shuko Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 76 days.

(21) Appl. No.: 11/864,746

(22) Filed: Sep. 28, 2007

(65) Prior Publication Data

US 2008/0283601 A1 Nov. 20, 2008

(30) Foreign Application Priority Data

Dec. 28, 2006 (JP) ............................ 2006-356117

(51) Int. Cl.
*G06K 7/00* (2006.01)

(52) U.S. Cl. ..................... 235/486; 235/439; 340/572.8

(58) Field of Classification Search ................. 235/439, 235/486; 343/878, 880, 882
See application file for complete search history.

(56) References Cited

U.S. PATENT DOCUMENTS

| | | | | |
|---|---|---|---|---|
| 3,398,475 | A * | 8/1968 | Palmer | 40/658 |
| 5,697,594 | A * | 12/1997 | Adams et al. | 248/442.2 |
| 5,845,889 | A * | 12/1998 | Suzuki | 248/451 |
| 5,929,760 | A * | 7/1999 | Monahan | 340/572.7 |
| 5,962,834 | A * | 10/1999 | Markman | 235/385 |
| 6,067,057 | A * | 5/2000 | Yajima et al. | 343/878 |
| 6,792,653 | B2 * | 9/2004 | Protz | 24/485 |
| 7,609,225 | B2 * | 10/2009 | Chang | 343/878 |
| 2006/0092027 | A1 | 5/2006 | Ito | |
| 2006/0123605 | A1 * | 6/2006 | Adair | 24/498 |
| 2006/0177291 | A1 * | 8/2006 | Kienzl et al. | 414/331.15 |
| 2006/0208886 | A1 * | 9/2006 | Beamer | 340/572.1 |
| 2006/0250254 | A1 | 11/2006 | Harris et al. | |
| 2007/0095922 | A1 * | 5/2007 | Kawai | 235/492 |
| 2007/0119927 | A1 * | 5/2007 | Wingo et al. | 235/385 |

FOREIGN PATENT DOCUMENTS

DE 42 38 225 A 1 5/1994

(Continued)

OTHER PUBLICATIONS

Extended European Search Report issued in corresponding European Patent Application No. 07117523.6 on Apr. 17, 2008.

(Continued)

*Primary Examiner*—Michael Lee
*Assistant Examiner*—Suezu Ellis
(74) *Attorney, Agent, or Firm*—Staas & Halsey LLP

(57) ABSTRACT

In a mechanism for attaching to a cart an RFID tag used for transmitting and receiving data to and from an RFID reader/writer, a holding pocket retains the RFID tag. The orientation of the pocket is kept constant in such a manner that a surface of the RFID tag from which data can be read highly accurately faces an antenna for the RFID reader/writer while keeping the distance between the RFID tag and the antenna within a certain range regardless of the transfer direction of the cart.

6 Claims, 13 Drawing Sheets

FOREIGN PATENT DOCUMENTS

| | | | |
|---|---|---|---|
| JP | 8-286749 | | 11/1996 |
| JP | 2003-36422 | | 2/2003 |
| JP | 2005-289605 | | 10/2005 |
| JP | 2006-176249 | | 7/2006 |
| KR | 10-2006-0100053 | | 9/2006 |
| WO | WO 2004104912 | A1 * | 12/2004 |
| WO | 2006/053381 | A1 | 5/2006 |
| WO | 2006/060178 | A2 | 6/2006 |

OTHER PUBLICATIONS

Korean Notice of Preliminary Rejection issued on Dec. 19, 2008 in corresponding Korean Patent Application 10-2007-0103017.

Chinese Patent Office Action, mailed Jun. 5, 2009 and issued in corresponding Chinese Patent Application No. 200710181942.4.

* cited by examiner

MECHANISM FOR ATTACHING RFID TAG, TRANSFER DEVICE AND TRANSFER SYSTEM USING RFID TAG

CROSS REFERENCE TO RELATED APPLICATIONS

This application is based on and hereby claims priority to Japanese Application No. 2006-356117 filed on Dec. 28, 2006, the contents of which are hereby incorporated by reference.

BACKGROUND OF THE INVENTION

1. Field of the Invention

The present invention relates to a technique of attaching RFID (Radio Frequency IDentification) tags to transfer devices for transferring objects.

2. Description of the Related Art

In assembly lines or inspection lines for transferring components or products, it is common for the components or products to be assembled or inspected while being transferred on pallets or carts. When components are to be assembled or products are to be inspected while being transferred on transfer devices such as pallets, carts, or the like, bar code labels are often applied to the products or to transfer devices to be used for identifying the respective products or understanding the progress of respective steps such as assembling or inspecting, and thereby the bar codes are read with a bar code reader in order to collect necessary information. If it is desired that a bar code reader read information from bar code labels, then limitations on reading operations performed by operators, limitations whereby the positional relationship between the bar code labels and the bar code reader have to be constant, or other such limitations must be imposed.

RFID tags can hold more information than bar code labels and can store data. Because of this, RFID tags have been widely used recently for controlling the steps of assembly and the inspection of components and products.

When RFID tags are used for controlling assembly steps or inspection steps, RFID tags are conventionally attached to transfer devices such as pallets, carts or the like used for transferring products. Thereafter, necessary information is read and written from and to the RFID tags by using an antenna for an RFID reader/writer provided near the assembly line or the inspection line.

FIGS. 1 and 2 respectively show conventional methods of attaching RFID tags to transfer devices. FIG. 1 shows an example of attaching an RFID tag to a transfer pallet in a conventional method. An RFID tag 104 is affixed to the top surface or a side surface of a transfer pallet 100 that is for carrying transferred objects 103 such as components, products or the like. The spot to which the RFID tag 104 is affixed is determined in accordance with its positional relationship with an antenna attached to a reader/writer. Specifically, the RFID tag is affixed within the communication distance in such a manner that the surface of the RFID tag, from which data can be read highly accurately, faces the antenna while taking into consideration the communication distance and communication directivity.

Conventionally, in order to attach RFID tags to transfer carts, RFID tags are either affixed to particular spots or, when transferred objects are larger than the areas of the top surfaces of the carts, held in dedicated pockets provided in transfer devices.

FIG. 2 shows a conventional example of attaching an RFID tag to a transfer cart. A cart 110 carrying the transferred object 103 moves on a transfer rail (not shown). An antenna 101 for a reader/writer is arranged on the near side with respect to the cart 110 in FIG. 2.

When an RFID tag 104A is to be affixed directly to a component/product with adhesive tape or the like, or when an RFID tag 104B is to be held in a pocket 105 attached to the cart 110, the RFID tags 104A and 104B have to be attached while taking into account the distance and position that allow for the communication between the RFID tags and the antenna 101, 102 for the reader/writer.

Specifically, both in the case when the RFID tag is to be affixed directly to the transferred object 103 and in the case when the RFID tag is to be held in the pocket 105 attached to the cart, the tags 104A and 104B have to be positioned within the distance over which communication with the antenna 101 or 102 is allowed. The side including the RFID tag may not be closest to the antenna 101 or 102, depending on the direction of movement of the cart 110. Also, the surface of the RFID tag, from which data can be read highly accurately, sometimes may not be facing the antenna or the position at which the RFID tag is attached may be out of the range over which the communication is allowed, so that the accuracy of reading information from RFID tags is affected.

Because methods of attaching RFID tags to carts as described above are employed conventionally, the direction of movement of the carts is limited in accordance with the attached RFID tags when the RFID tags are used for performing production management or quality management in assembly/inspection lines. Specifically, there have been only two methods used to provide an antenna and RFID tags in a positional relationship that satisfies the conditions of the directivity and the communication distance: either the antenna has been set on the side from which the antenna can face the RFID tags, causing a limitation on the direction of the movement of carts, or several antennas have been set in a plurality of locations around the carts so as to not limit the direction of movement of carts.

Production management and quality management performed by using RFID tags are expected to become more widely used. In particular, UHF (Ultra-High Frequency) band RFID tags allow a communication distance of several meters, which is a greater distance than other types of RFID tags, and by using the UHF band RFID tags it is possible to introduce RFID systems to production lines and inspection lines with a higher degree of freedom in the positional relationship between tags and an antenna for a reader/writer. When introducing the RFID tag systems, it is desirable that limitations on the direction of movement of transfer devices not be imposed and that the number of antennas does not have to be increased.

SUMMARY OF THE INVENTION

It is an object of the present invention to provide a technique by which a deterioration in the accuracy of reading information from RFID tags that can be caused by variations in the direction of movement of transfer devices carrying the RFID tags can be prevented while suppressing cost.

As an aspect of the present invention, a mechanism for attaching to a transfer device an RFID tag used for transmitting and receiving data to and from an RFID reader/writer is provided, the mechanism comprising: retaining unit for retaining the RFID tag; and holding unit for holding the retaining unit in such a manner that a surface of the RFID tag from which data can be read highly accurately faces an antenna for the RFID reader/writer while keeping a distance between the RFID tag and the antenna within a certain range regardless of a transfer directions of the transfer device.

Even when the transfer direction is changed by turning the transfer device, the retaining unit retaining the RFID tag holds the RFID tag in such a manner that the distance between the RFID tag and the antenna for the RFID reader/writer is constant. Thereby, it is possible to prevent deterioration in accuracy in reading information from the RFID tag due to a change in the transfer direction.

Further, it is possible that when the transfer direction of the transfer device is changed by one hundred and eighty degrees, the holding unit will fix the retaining unit at a position such that the distances to the antenna before and after the change of the transfer direction are the same. Even when the transfer direction is changed by one hundred and eighty degrees, the distance between the antenna for the RFID reader/writer and the surface of the RFID tag, from which data can be read highly accurately, is kept constant, and thereby deterioration in the reading accuracy is prevented.

Alternatively, it is possible for the holding unit to comprise a rotation member that rotates, when the transfer direction of the transfer device is changed, the retaining unit in accordance with the change in the transfer direction. Further, it is also possible for the mechanism to comprise a projection member projecting inwardly on the rotation member from a space away from the rotation member; and an elastic member provided away from the rotation member and pushing the projection member, and: when the retaining unit is rotated by the rotation member, the projection member escapes to a space away from the rotation member while applying a force to the elastic member, and when the retaining unit passes through, said projection member returns to an original position by being pushed by an elastic force of the elastic member.

Alternatively, it is possible for the mechanism to further comprise: a post member extending from the transfer device; and a wheel member attached to the post member and being directed toward a direction of movement of the transfer device, and further, for the retaining unit to comprise the post member, and the post member to rotate in accordance with the direction of the wheel member.

It is also possible for the holding unit to hold the retaining unit in such a manner that a surface of the RFID tag from which data can be read highly accurately is parallel to the antenna for the reader/writer provided in a parallel orientation to the floor.

The scope of the present invention is not limited to the above mechanism for attaching an RFID tag, but can be applied to a transfer device, a transfer system, and the like, each including the above mechanism for attaching an RFID tag.

According to the present invention, even when the transfer direction of a transfer device having an RFID tag is changed, the accuracy in reading information from the RFID tag does not deteriorate, and accordingly it is possible to perform stable reading/writing processes from and to RFID tags at a low cost.

DESCRIPTION OF THE PREFERRED EMBODIMENTS

Figure 1:
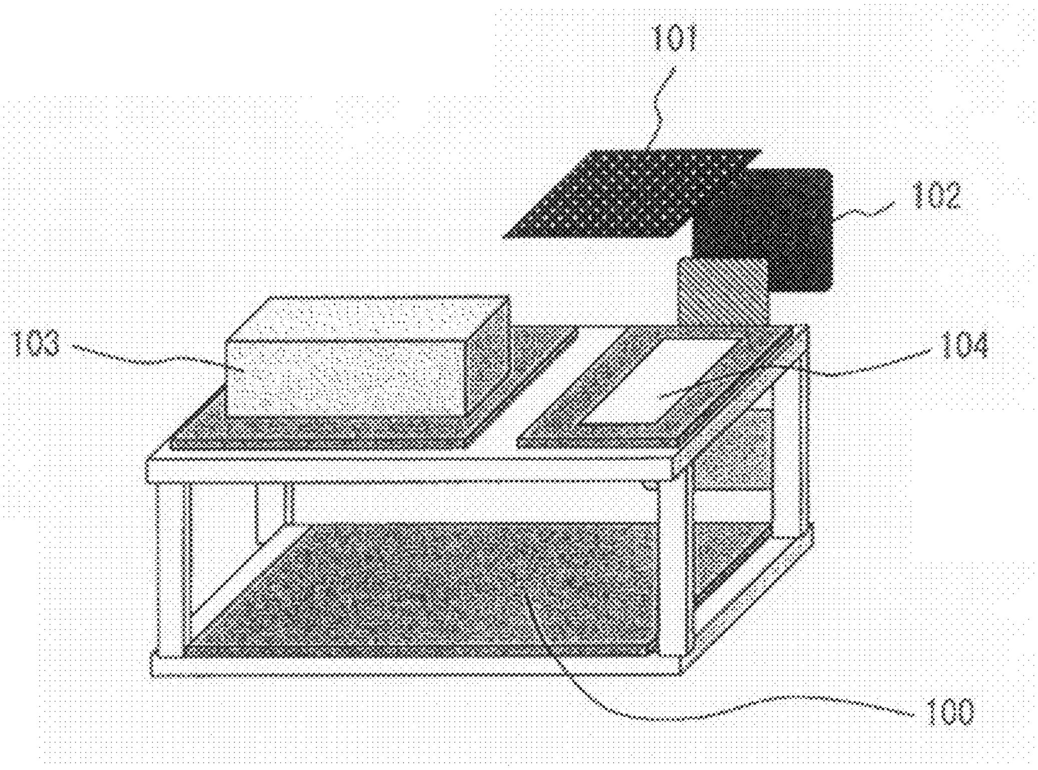
FIG. 1 (Prior Art)
FIG. 1 shows an example of attaching an RFID tag to a transfer pallet in a conventional method.
Figure 2:
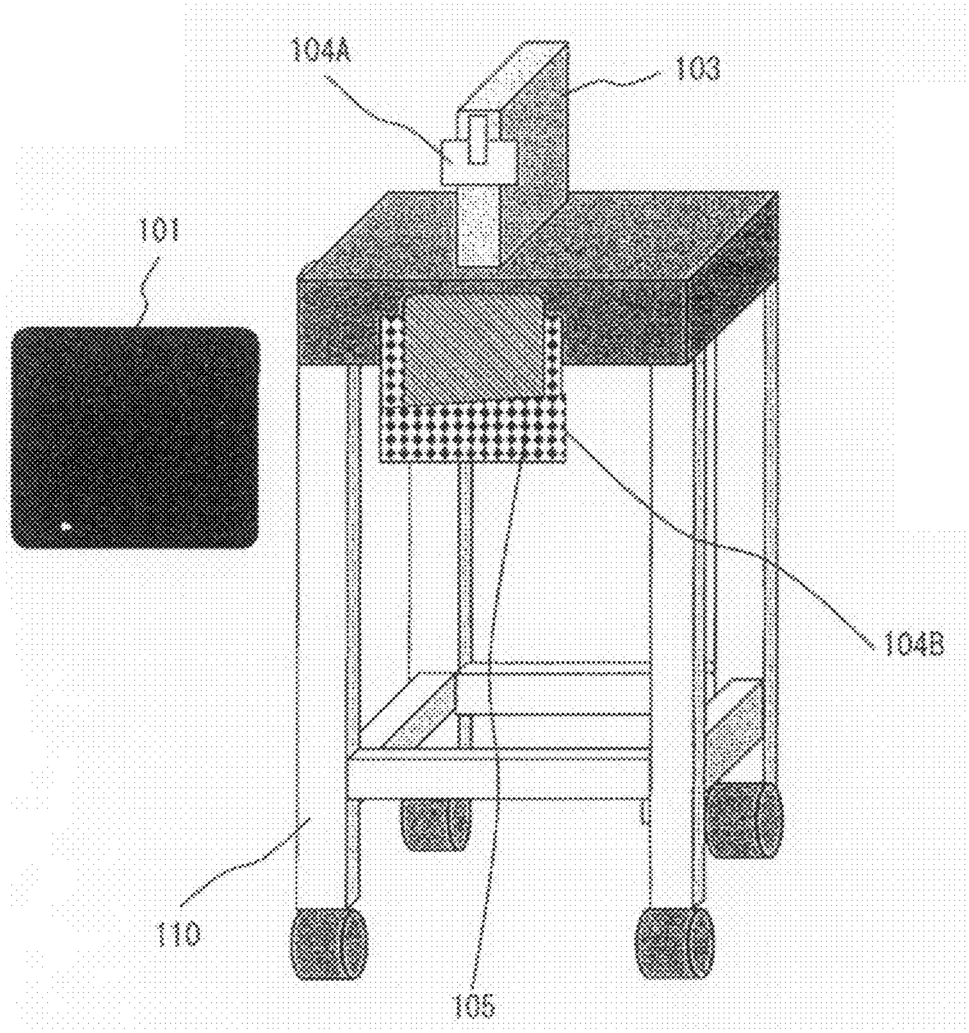
F I G. 2 (Prior Art)
FIG. 2 shows a conventional example of attaching an RFID tag to a transfer cart.

Hereinafter, preferred embodiments of the present invention will be explained in detail by referring to the drawings.

Figure 3:
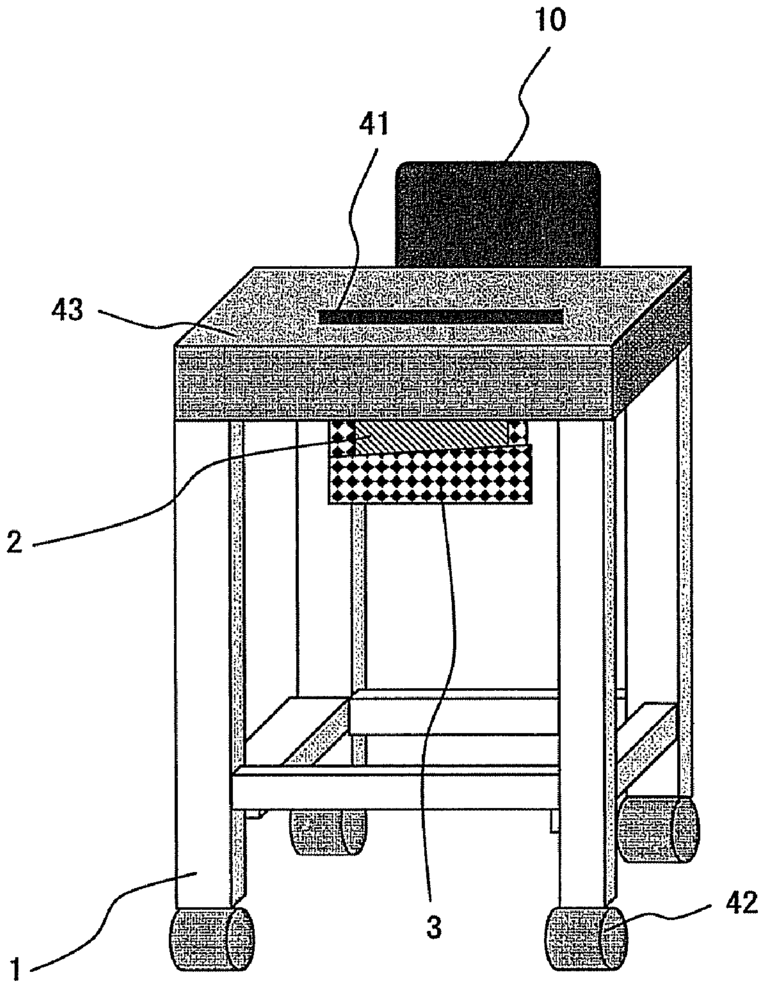
FIG. 3 shows a configuration of a transfer system according to a first embodiment of the present invention.

FIG. 3 shows a schematic configuration of a transfer system according to a first embodiment of the present invention. The transfer system shown in FIG. 3 comprises a cart 1 that carries a transferred object in order to transfer it and an antenna 10 for a reader/writer.

The cart 1 is a transfer device for carrying transferred objects such as components, products, or the like in order to transfer them. The cart 1 shown in FIG. 3 includes four legs, each of which has a caster 42 and moves on a transfer path in accordance with production steps such as assembly steps or inspection steps for products. The antenna 10 for the reader/writer is provided along the transfer path (assembly line, inspection line or the like) for the cart 1, and the reader/writer (not shown) performs data write processes to an RFID tag 2 and data read processes from the RFID tag 2 in accordance with progress in assembly/inspection operations.

In the transfer system shown in FIG. 3, the antenna 10 is provided at the left side with respect to the movement direction of the cart 1 and in such a manner that the antenna 10 and the RFID tag 2 are within communication distance when the RFID tag 2 passes in front of the antenna. This configuration is employed because the antenna 10 for the reader/writer is generally provided along the transfer path and at a position where the antenna 10 does not interfere with the movement of the cart 1; in other words, at a position that does not require the cart 1 to change its orientation to perform the communication of data between the RFID tag 1 and the antenna 10.

FIG. 3 does not show the transfer path for the cart 1. Assembly operations or inspection operations are performed at a desired position with the cart 1 moved along a transfer rail that is laid on, for example, the floor.

The RFID tag 2 is held in a holding pocket (hereinafter simply referred to as pocket) 3 attached to the cart 1, and stores various data on the object transferred on the cart 1 in order to manage steps in the assembly, inspection, or the like. When the RFID tag 2 passes in front of the antenna 10 for the reader/writer provided along the transfer path for the cart 1, data on the transferred object carried by the cart 1 or on operation steps is communicated between the RFID tag 2 and the reader/writer.

On the top surface of a top plate 43, a slit 41 is provided as an insertion opening for the RFID tag 2. On the bottom surface of the top plate 43, the pocket 3 is fixed to the top plate 43. The pocket 3 is fixed to the top plate 43 in such a manner that the opening of the pocket 3 is connected to the slit 41. The RFID tag 2 is dropped into the pocket 3 through the slit 41, and is retained at the bottom portion of the pocket 3.

The slit 41 is sufficiently wide so that the RFID tag 2 can be inserted through it at an angle causing the surface of the RFID tag 2, from which data can be read highly accurately, to be approximately orthogonal to the top plate 43. The pocket 3 has a width such that it can retain the RFID tag 2; this width is the same as that of the slit 41 of the top plate 43. Thereby, the RFID tag 2 that has been inserted through the slit 41 is dropped from the top surface of the top plate while keeping constant its orientation, and is held at the bottom of the pocket 3 in the same orientation as that upon being inserted.

Figure 4A:
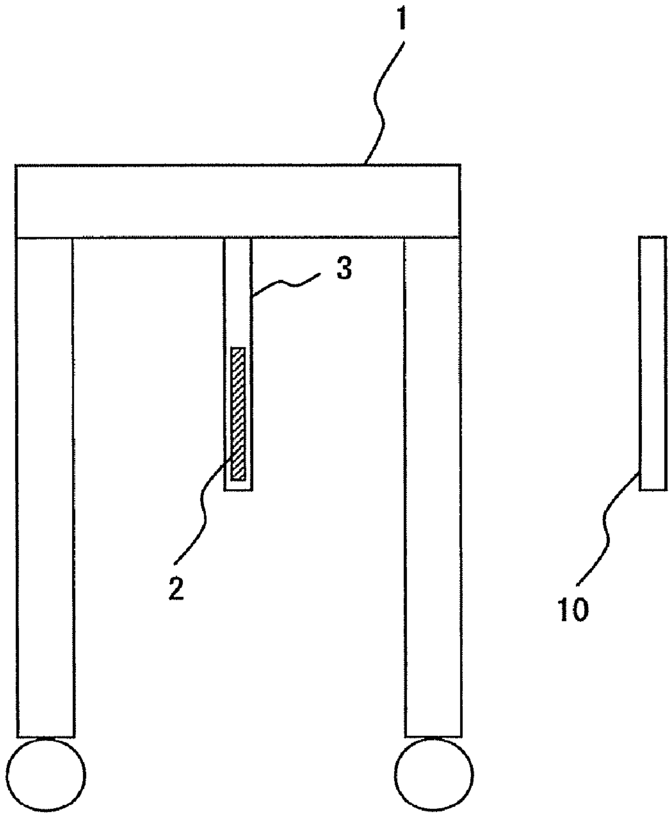
FIG. 4A is a side view of the transfer system according to the first embodiment of the present invention.
Figure 4B:
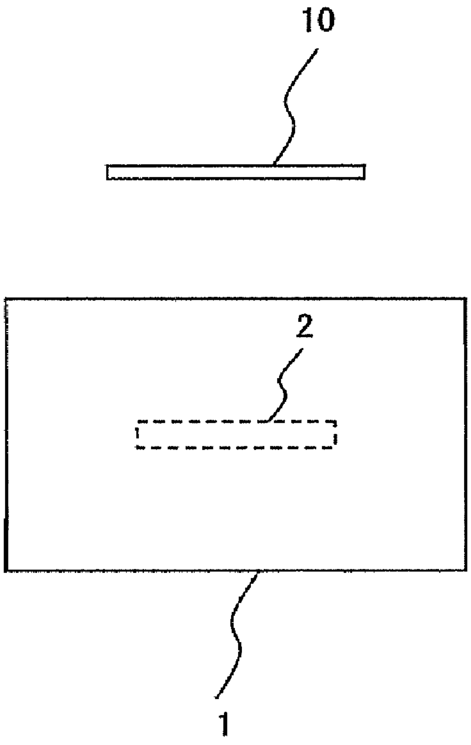
FIG. 4B is a top view of the transfer system according to the first embodiment of the present invention.

FIGS. 4A and 4B show a configuration of the cart 1 according to the first embodiment of the present invention. FIG. 4A is a side view of the transfer system according to the present embodiment. FIG. 4B is a top view of the transfer system according to the present embodiment.

As was described by referring to FIG. 3, the RFID tag 2 is held in the pocket 3 in such a manner that the surface of the RFID tag 2, from which data can be read highly accurately, is approximately orthogonal to the slit 41 of the cart 1. Also, as shown in FIG. 4A, the pocket 3 and the slit 41 in the cart 1 are provided at a position whose distance from the antenna 10 is approximately constant even when the cart 1 is rotated by one hundred and eighty degrees. The phrase "rotation of the cart 1", herein and throughout, refers to a rotation of the cart 1 about the center of the top plate 43 made by using the casters 42.

Generally, the top plate 43 of the cart 1 is rectangular when being viewed from above, as shown in FIG. 4B. When the top plate 43 is rectangular, by providing the slit 41 and the pocket 3 at the midpoint between the two sides of the top plate 43 that are parallel to the movement direction of the cart in such a manner that the surface of the RFID tag 2, from which data can be read highly accurately, faces the antenna 10, it is possible to keep the distance between the antenna 10 and the RFID tag 2 approximately constant even when the cart 1 is rotated by one hundred and eighty degrees.

After the cart 1 is rotated by one hundred and eighty degrees, the surface of the RFID tag 2 in the pocket 3, opposite the surface that faced the antenna 10 before the rotation, faces the antenna 10. However, the influence on the reading accuracy is much smaller than that in the case when other surfaces face the antenna 10. Thus, according to the cart 1 in the present embodiment, a transfer can be performed arbitrarily in two directions without deteriorating the reading accuracy.

As described above, according to the cart 1 in the first embodiment of the present invention, stable reading and writing of data can be performed between the RFID tag 2 and the antenna 10 provided along the transfer path without deteriorating the reading accuracy even when the cart 1 is rotated by one hundred and eighty degrees. Thereby, when the RFID system is introduced to a transfer system, the antenna 10 can be arranged arbitrarily (i.e., in accordance with a configuration of a production/inspection line) on either side of the transfer path without influencing the reading accuracy. Also, when the cart is set on the transfer line, the orientation of the cart 1 (RFID tag 2) does not have to be taken into consideration.

In other words, according to the cart 1 in the present embodiment, the degree of freedom of movement of the cart 1 in two directions can increase without deteriorating the reading accuracy from the RFID tag 2; therefore, the degree of freedom of designing assembly lines and inspection lines can increase while suppressing the cost. An increase in the number of antennas causes a higher cost, and adjustment of the positions of the antennas is required in order to prevent interference between the antennas as they increase in number, and this increases the number of work steps. In the present embodiment, the cart 1 can be used freely in the two directions mentioned above without providing antennas on both sides, and without deteriorating the reading accuracy from the RFID tags 2; accordingly, the introduction of the RFID tag system to assembly lines or inspection lines is facilitated.

Next, a transfer system according to a second embodiment of the present invention is explained by referring to FIGS. 5A through 7.

Figure 5A:
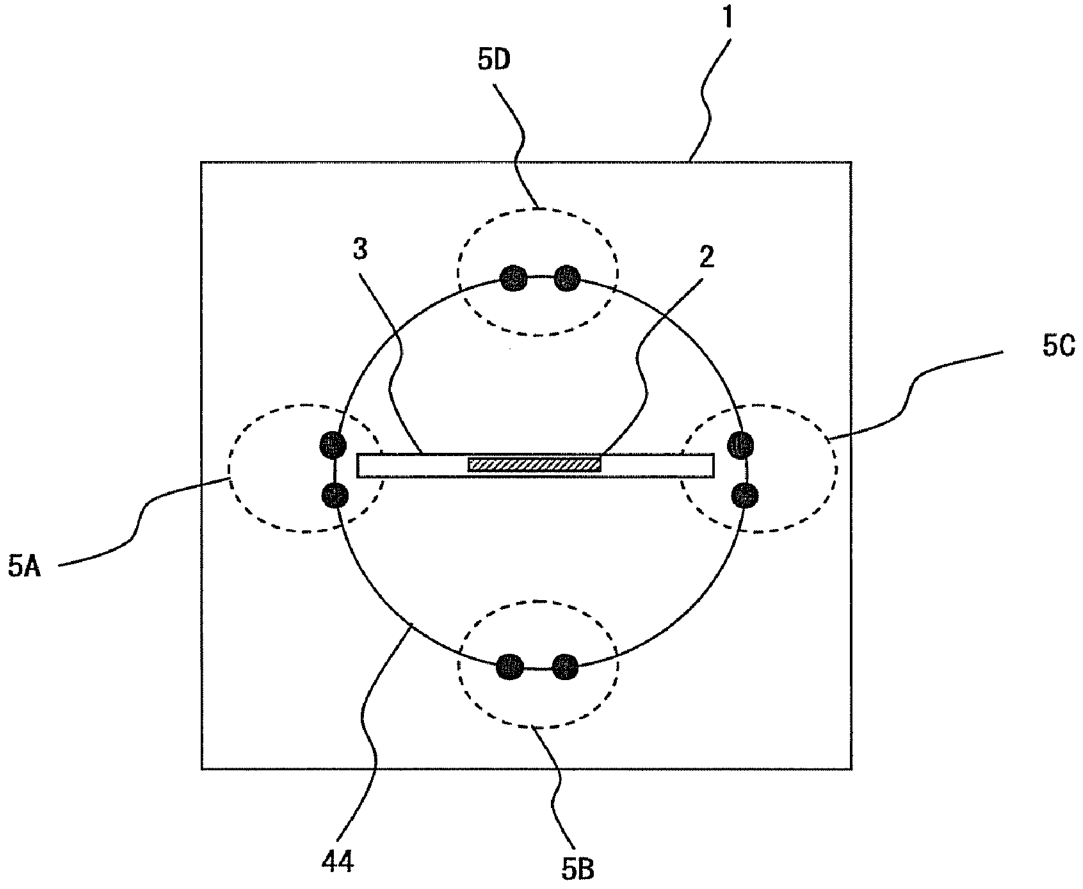
FIG. 5A shows a top plate on a cart according to the second embodiment, viewed from the bottom.
Figure 5B:
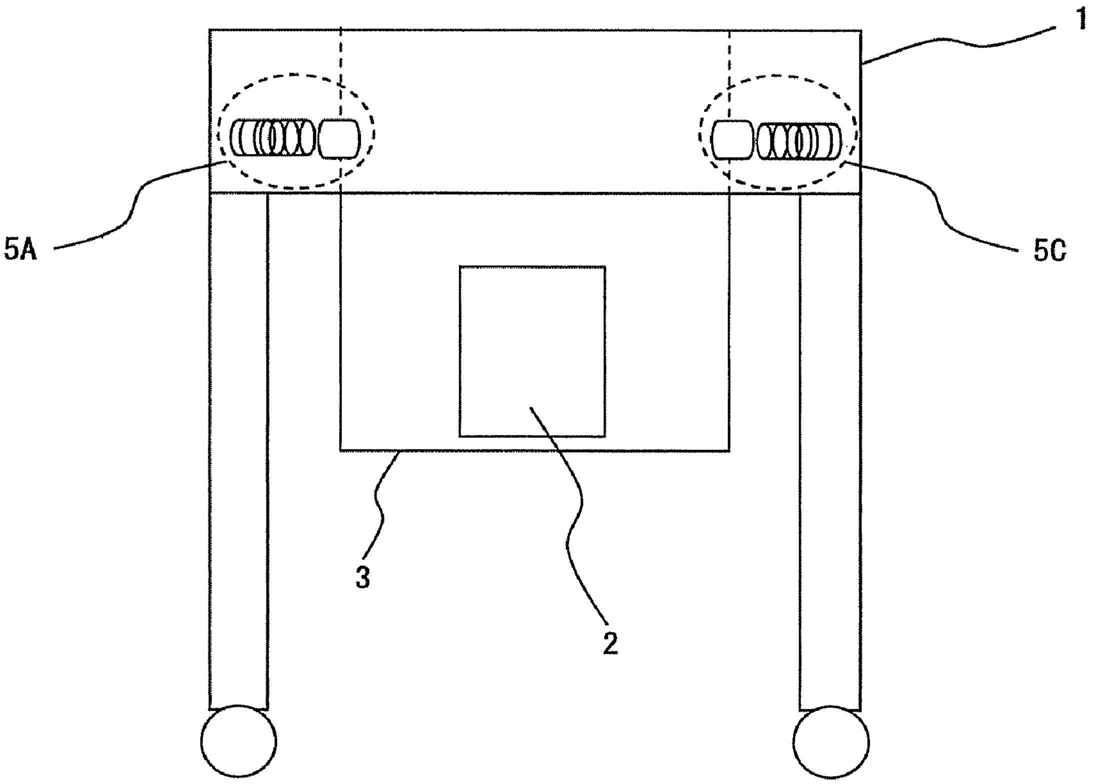
FIG. 5B is a side view of the cart according to the second embodiment.

FIGS. 5A and 5B show a configuration of the cart 1 according to the second embodiment of the present invention. In the cart 1 according to the second embodiment, the pocket 3 is attached to the top plate 43 such that it is rotatable in a step-by-step manner by ninety degrees and can face in four directions, whereas the cart 1 according to the first embodiment includes the pocket 3 fixed to the top plate 43 and is able to face only in two directions. The first and second embodiments are identical to each other in the other points mentioned. Accordingly, explanations on the same points are omitted, and only the points different from that in the first embodiment will be explained.

FIG. 5A shows the top plate 43 on the cart 1 in the second embodiment viewed from the bottom. The pocket 3 is attached to a rotation table 44 provided on the bottom of the top plate 43 such that the pocket can rotate. Both ends of the pocket 3 contact the periphery of the rotation table 44, and are locked by lock mechanisms 5 provided on the periphery of the rotation table 44 such that the pocket 3 is locked at a certain position on the rotation table 44.

The lock mechanisms 5 are provided at four spots on the rotation table 44 at a constant interval in the present embodiment, and pairs of lock mechanisms facing each other over the center of the rotation table 44 (lock mechanisms 5A and 5C or 5B and 5D in the example shown in FIG. 5A) lock the pocket 3. In FIG. 5A, lock mechanisms 5A and 5C are paired in order to lock the pocket 3 in the lateral directions in FIG. 5A, and lock mechanisms 5B and 5D are paired in order to lock the pocket in the longitudinal directions in FIG. 5A.

FIG. 5B is a side view showing the cart 1 including the pocket 3 locked by the pair of lock mechanisms 5A and 5C. Because both ends of the pocket 3 are locked by lock mechanisms 5A and 5C, the accuracy of reading and writing data from and to the RFID tag 2 retained in the pocket is constant no matter which position the antenna 10 is set in between the front side and the far side in FIG. 5B.

Figure 6:
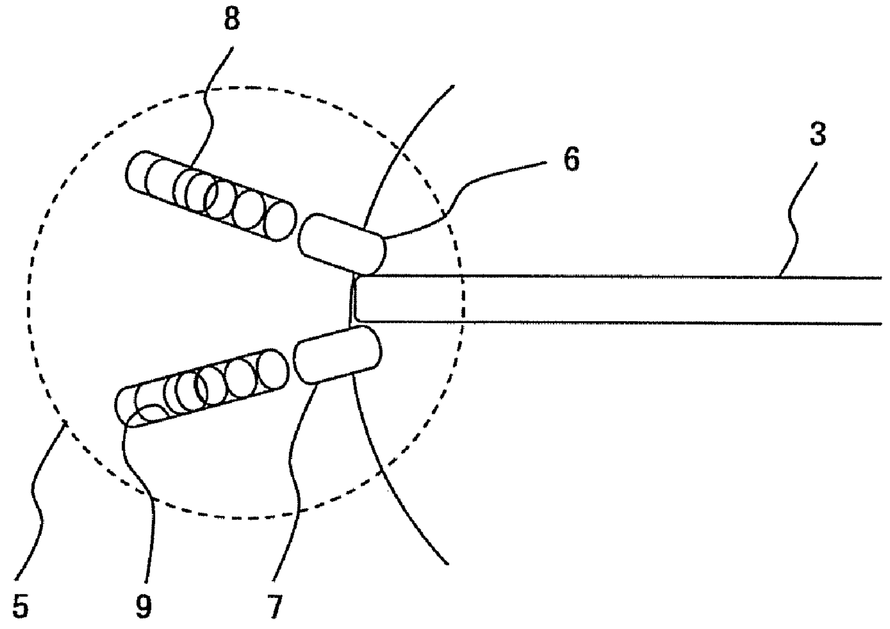
FIG. 6 shows a configuration example of a lock mechanism.

FIG. 6 shows a configuration example of the lock mechanism 5. The lock mechanism 5 comprises a pair of members comprising of projection member 6 and elastic member 8, and a pair of members comprising of projection member 7 and elastic member 9. Projection member 6 and elastic member 8 form one locking member, and projection member 7 and elastic member 9 form another locking member. The configurations and the operations are the same between the two pairs, and accordingly projection member 6 and elastic member 8 are explained hereinafter to refer to the general case.

The projection member 6 is provided on the periphery of the rotation table 44 and projects toward the center of the rotation table 44. The elastic member 8 is provided away from the rotation table 44, and made of an elastic body such as a spring or the like. The projection member 6 is pushed by the elastic member 8, and escapes to the space away from the rotation table 44 when a force from the pocket 3 is applied to the projection member 6.

Because the pocket 3 contacts the periphery of the rotation table 44, when a force is applied to the pocket 3 in, for example, the clockwise direction, the pocket 3 rotates in the clockwise direction while the projection member 6 escapes to the space away from of the rotation table 44. When the pocket 3 has passed through, the projection member 6 that has escaped to the space away from the rotation table 44 returns to its original position by being pushed by the elastic force applied by the elastic member 8.

Similarly, when a force in the counterclockwise direction is applied to the pocket 3, the projection member 7 escapes to the space away from of the rotation table 44, and the pocket 3 rotates in the counterclockwise direction. When the pocket 3 has passed through, the projection member 7 that has escaped to the space away from the rotation table 44 returns to its original position by being pushed by the elastic force applied inwardly on the rotation table 44 by the elastic member 9.

The pocket 3 is locked by the lock mechanisms 5 on the rotation table 44; however, when an external force is applied, the locking state is cancelled with the projection member 6 and 7 escaping, and the pocket 3 starts rotating in the clockwise or counterclockwise direction. When the pocket 3 that has started rotating contacts the lock mechanism 5, the projection member escapes to the space away from the rotation table 44, and the pocket 3 is again locked between the projection members 6 and 7. The lock mechanisms 5 are provided at four spots on the rotation table 44, and the pocket 3 is locked by the lock mechanisms 5 shown in FIG. 6 one time for each rotation of ninety degrees.

In FIGS. 5A and 5B, a configuration is shown in which both ends of the pocket 3 contact the periphery of the rotation table 44 and are locked by the lock mechanisms 5 shown in FIG. 6; however, the scope of the present invention is not limited to this configuration. For example, a configuration can also be employed in which one end of the pocket 3 is fixed to the center shaft of the rotation table 44, and only the other end of the pocket 3 is locked by the lock mechanisms 5.

Figure 7:
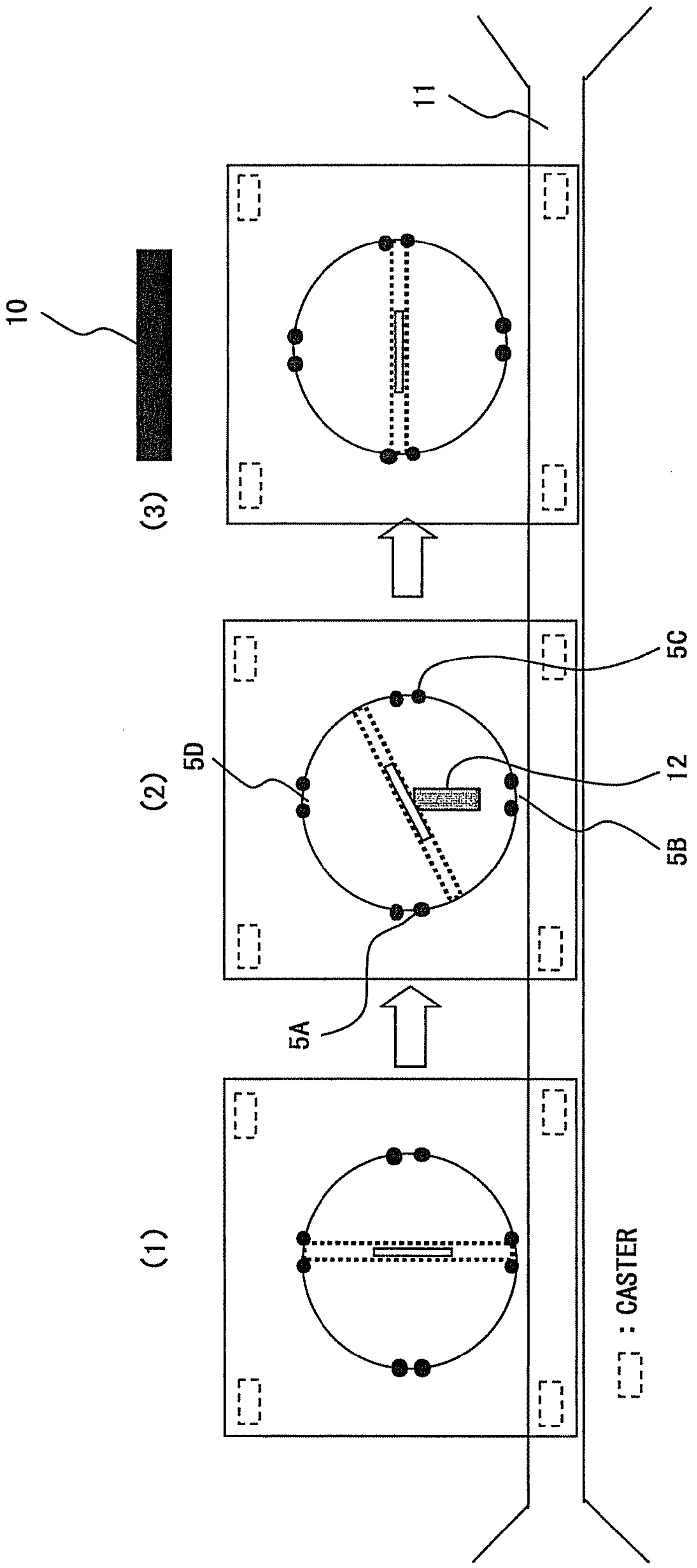
FIG. 7 shows operations of rotation of the RFID tag in a moving cart according to the second embodiment of the present invention.

FIG. 7 shows the rotation operations of the RFID tag 2 included in the moving cart 1 according to the second embodiment of the present invention. It is assumed that the cart 1 moves to the right along a transfer rail 11 in the figure. Additionally, in FIG. 7 only the rail that sustains the casters 42 shown in the lower part of the figure is shown, and the rail that sustains the casters 42 shown in the upper part of the figure is not shown.

On the floor of the transfer path for the cart 1, a rotation pole 12 is provided in order to push the pocket 3 in the cart 1 in a prescribed direction. In FIG. 7, the cart 1 is shown in the following states: (1) before the rotation, (2) the point in time at which the rotation pole starts the rotation of the pocket 3, and (3) after the rotation.

It is assumed that, before the pocket 3 contacts the rotation pole 12, the surface of the RFID tag 2, from which data can be read highly accurately, does not face the antenna 10 as shown in state (1). When the cart 1 moves to right in the figure on the transfer path while running on the rails 11, the pocket 3 attached to the cart 1 contacts the rotation pole 12 standing vertically on the floor, as shown in state (2).

When a force from the rotation pole 12 is applied to the pocket 3, the locking state maintained by lock mechanisms 5B and 5D is cancelled, and the pocket 3 starts rotating in the clockwise direction. The pocket 3 is again locked by lock mechanisms 5A and 5C. As shown in state (3), the pocket 3 is locked at the position at which the pocket 3 is parallel to the antenna 10, and reading and writing processes are performed between the reader/writer and the RFID tag 2 being retained in the pocket 3 parallel to the antenna 10.

As described by referring to FIGS. 5A through 7, the pocket 3 rotates on the rotation table 44 by contacting the rotation pole 12, and is locked by the lock mechanisms 5 for each rotation of ninety degrees. Thereby, the RFID tag 2 held in the pocket 3 is also locked for each rotation of ninety degrees. By providing the lock mechanisms 5 in accordance with the shape of the top plate 43 in the cart 1, the RFID tag 2 held in the pocket 3 can be locked in the desired orientations.

Figure 8A:
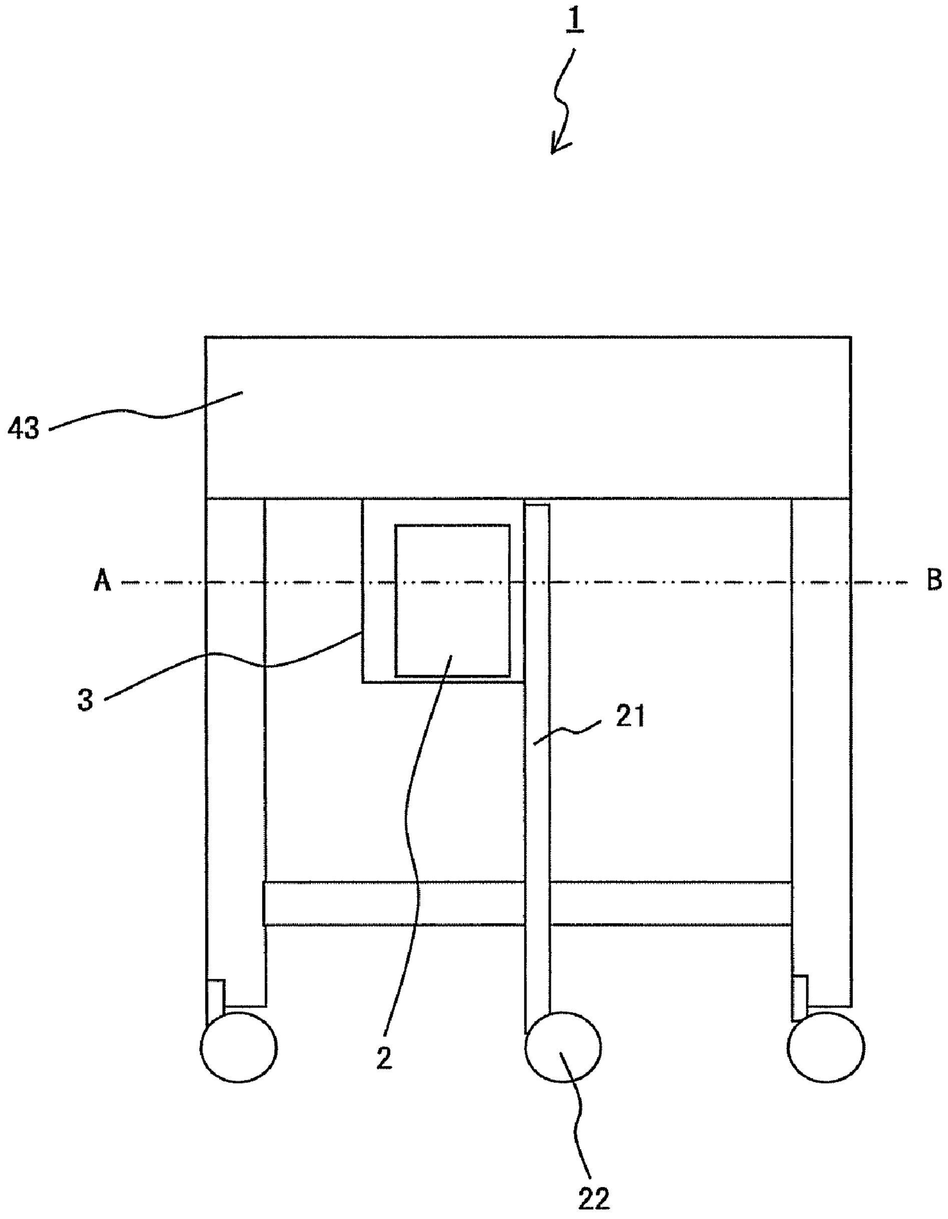
FIG. 8A is a side view of the cart according to a third embodiment.
Figure 8B:
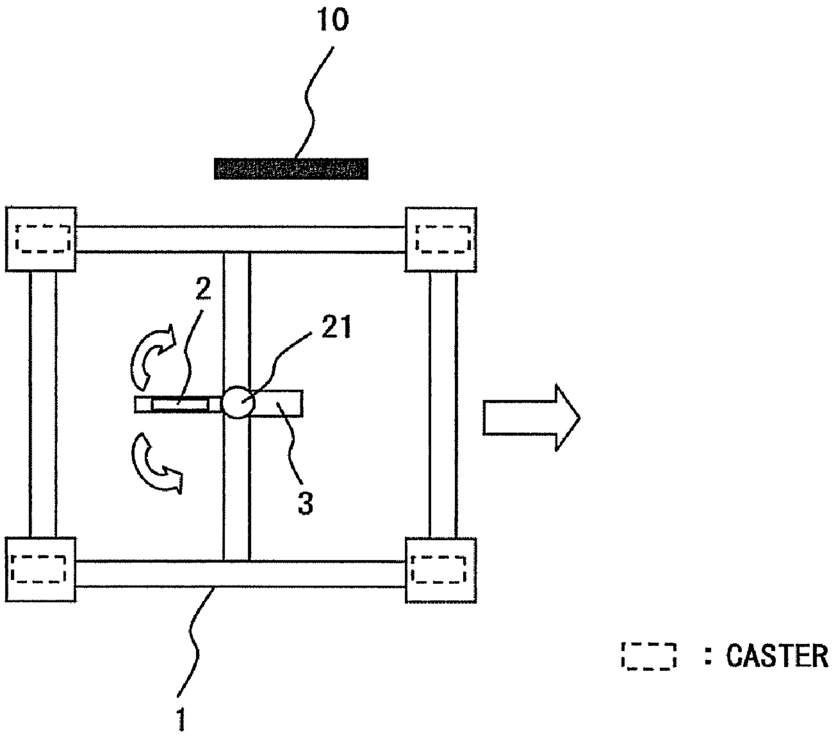
FIG. 8B is a sectional view of the cart according to the third embodiment.

FIGS. 8A and 8B show a configuration of the cart 1 according to a third embodiment of the present invention. FIG. 8A is a side view of the cart 1. FIG. 8B is a sectional view of the cart 1. The pocket 3 according to the present embodiment is attached to the rotation table, and is rotatable freely over three hundred and sixty degrees. In FIGS. 8A and 8B, only the cart 1 is shown, and other constituents in the transfer system such as the antenna 10 and the like and the other configurations of the cart 1 that are the same as those in the above described embodiments are not explained.

As shown in FIG. 8A, the cart 1 according to the present embodiment comprises a post 21. One end of the post 21 is connected to a spot in the vicinity of the center of the bottom surface of the top plate 43. The other end of the post 21 has a caster 22, and the caster 22 contacts the floor. The caster 22 has its shaft at a position offset from the wheel center, and tends to be oriented toward the moving direction of the cart 1. The post 21 rotates in accordance with the orientation of the caster 22. The purpose of the caster 22 is to convey to the post 21 the moving direction of the cart 1, which is different from the purpose of the casters 42 that move the cart 1.

At least one of the sides of the pocket 3 is attached to the post 21, and when the post 21 rotates in accordance with the rotation of the caster 22, the pocket 3 also rotates. It is also possible to employ a configuration in which the RFID tag 2 is inserted through the slit 41 in the top plate 43, and is held in the pocket 3 in a similar manner to the pocket in the above described embodiment. It is further possible to employ a configuration in which the RFID tag 2 is inserted directly to the pocket 3 in the case that the pocket 3 does not contact with the top plate 43.

FIG. 8B shows the top of the cart 1, and is a sectional view of the cart 1 cut along the chain double-dashed line AB in FIG. 8A. It is assumed that the cart 1 starts moving toward the right in FIG. 8B. When the cart 1 starts moving toward the right, the caster 22 is oriented toward the right because the moving direction of the cart 1 is toward the right.

The caster 22 is oriented toward the moving direction of the cart 1, the post 21 rotates, and the pocket 3 attached to the post 21 also rotates in accordance with the rotation of the post 21. In this manner, the cart 1 is oriented to be parallel to the antenna 10, and thereby the RFID tag 2 held in the pocket 3 is also oriented to face the antenna 10.

As described above, according to the transfer system in the third embodiment of the present invention, the caster 22 oriented toward the moving direction is provided to the post 21 connected to a spot in the vicinity of the center of the top plate 43 of the cart 1, and the caster 22 is oriented toward the moving direction of the cart 1; accordingly, the post 21 having the caster 22 and the pocket 3 attached to the post 21 are oriented in accordance with the movement of the caster 1. When the cart 1 gets closer to the antenna 10 for the reader/writer, the cart 1 is moved in parallel to the antenna 10 so that the surface of the RFID tag 2 held in the pocket 3, from which data can be read highly accurately, faces the antenna 10, and thereby it is possible to perform an arbitrary transfer in all the directions over three hundred and sixty degrees regardless of the orientation of the cart 1 without deteriorating the reading accuracy.

Generally, the shape of the surface of the top plate 43 on which transferred objects are placed is rectangular; accordingly, it is possible to realize a transfer system in which differing orientations of the cart 1 do not cause variations in accuracy in reading information from tags if the center of the surface of the top plate 43 on which transferred objects are placed and the antenna are within certain communication distance.

Hereinabove, the methods of attaching the RFID tag 2 to the cart 1 have been explained in the case in which the antenna 10 is provided beside the moving course of the cart 1. Next, a transfer system is explained by which the cart 1 can be used without imposing any limitation on the degree of freedom of the moving directions while preventing deterioration in the accuracy of reading information from the RFID tag 2 even when the antenna is provided on the floor.

Figure 9A:
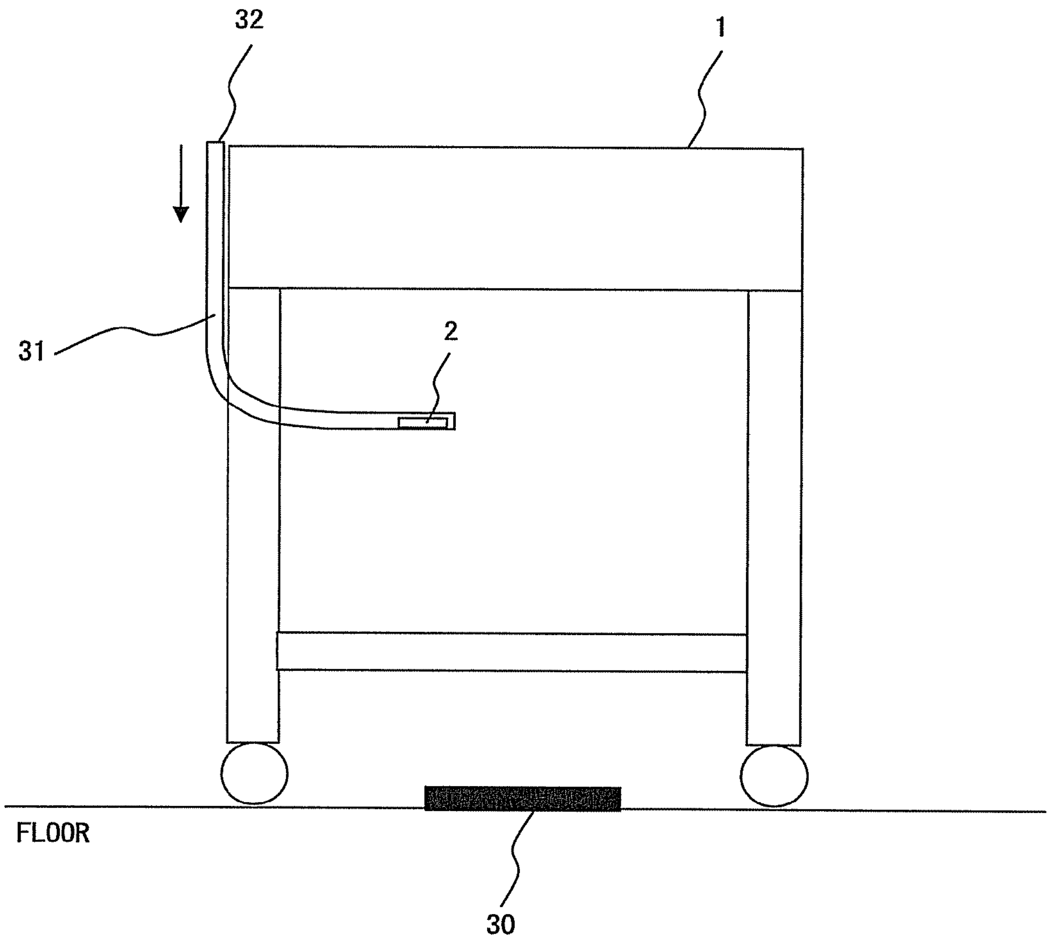
FIG. 9A is a side view of the cart according to a fourth embodiment.
Figure 9B:
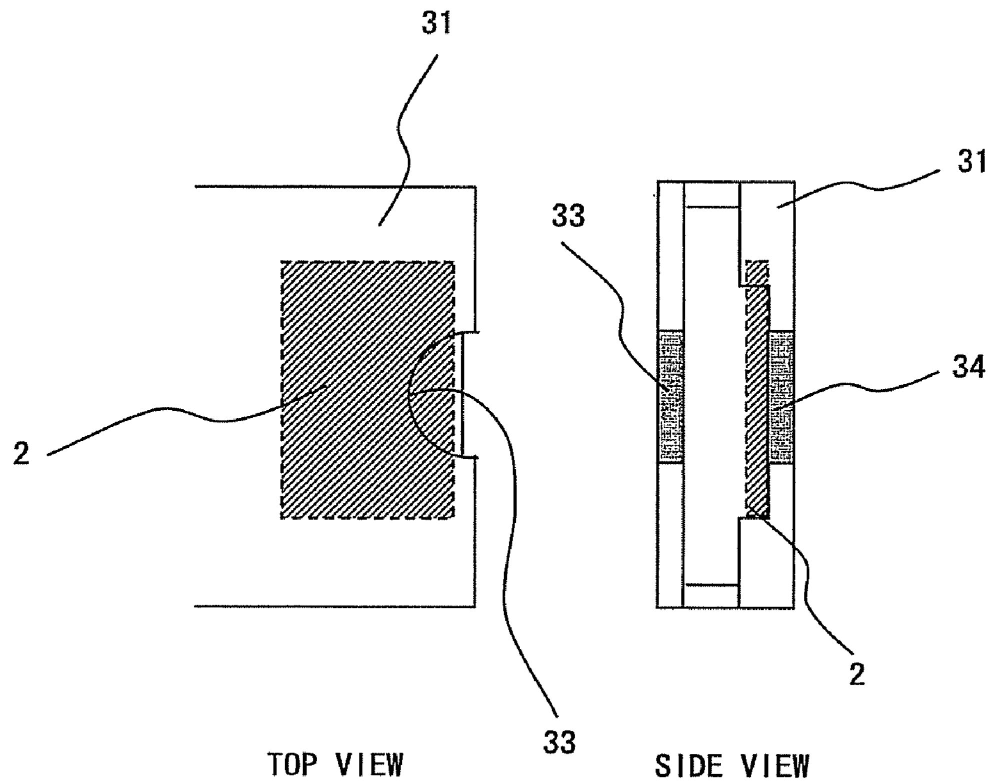
FIG. 9B shows a holder for holding the RFID tag according to the fourth embodiment.

FIGS. 9A and 9B show a configuration of the cart 1 according to the fourth embodiment of the present invention. FIG. 9A is a side view of the cart 1. FIG. 9B shows a holder for holding the RFID tag 2. In the transfer system according to the present embodiment of the present invention, an antenna 30 for the reader/writer is provided on the transfer path for the cart 1, whereas in the transfer system according to the above described embodiments, the antenna 10 for the reader/writer is provided beside the transferring course.

Specifically, the antenna 30 is provided between a pair of rails on which the cart 1 runs. FIG. 9A shows the state in which the cart 1 that has moved on the rails is above the antenna 30.

The cart 1 comprises a shooter mechanism 31 for keeping the surface, from which data can be read highly accurately, parallel to the floor. The shooter mechanism 31 comprises, in the example shown in FIG. 9A, an insertion portion 32. When the RFID tag 2 is inserted through the insertion portion 32, the RFID tag 2 is held in the holder beneath the top plate 43 in such a manner that the surface of the RFID tag 2, from which data can be read highly accurately, is parallel to the floor.

The antenna 30 is provided on the floor, and the RFID tag 2 is held in the holder in the cart 1 in such a manner that the surface of the tag, from which data can be read highly accurately, is parallel to the floor, and thereby a constant reading accuracy is maintained regardless of the transfer direction of the cart 1.

Further, as shown in FIG. 9B, the end portion of the shooter mechanism 31 serves as a holder for holding the RFID tag 2. During assembly or inspection of transferred objects such as components, products, or the like carried on the pocket 3, the RFID tags 2 are held in the holders. However, the RFID tags 2 have to be away from the holders before and after assembly or inspection. In the present embodiment, in order to facilitate removal of the RFID tags 2, the holder has, in this example, notches 33 and 34. Notches 33 and 34 provided at the end portion of the holder permit users to remove the RFID tags 2 easily.

As described above, even when the antenna 30 is provided on the floor, it is possible to transfer objects without taking into consideration the orientations of the carts 1 while preventing a deterioration in reading accuracy similarly to the above embodiments by causing the surfaces of the RFID tags 2, from which data can be read highly accurately, to be parallel to the floor, i.e., to the antenna 30.

Additionally, in the above explanations, the tag is set under the top plate 43 in the cart 1; however, the scope of the present invention is not limited to this configuration. For example, the RFID tag 2 may be set at a level higher than the top plate 43 in the cart 1. The level at which the RFID tag 2 is set can be arbitrarily modified in accordance with differing configurations of the RFID systems such as the position at which an antenna for a reader/writer is set or the like.

Also, in the above explanations, a cart is used as an example of transfer devices. However, the scope of the present invention is not limited to this example. The above respective embodiments can be applied not only to carts, but also to any type of transfer device that moves along a transfer path while carrying RFID tags.

What is claimed is:

1. A mechanism for attaching to a transfer device an RFID tag used for transmitting and receiving data to and from an RFID reader or writer, comprising:

a retaining unit to retain the RFID tag; and a holding unit to hold the retaining unit in such a manner that a surface of the RFID tag from which data can be read highly accurately faces an antenna of the RFID reader or writer while keeping a distance between the RFID tag and the antenna within a certain range regardless of a transfer direction of the transfer device, the holding unit including a rotation member, the rotation member rotating the retaining unit in accordance with and when a change in the transfer direction occurs, a projection member provided on the periphery of the rotation member and projects toward the center of the rotation member; and an elastic member provided away from the rotation member and pushing the projection member, wherein:

when the retaining unit is rotated by the rotation member, the projection member escapes to a space away from the rotation member while applying a force to the elastic member, and when the retaining unit passes through, said projection member returns to an original position by being pushed by an elastic force of the elastic member.

2. The mechanism for attaching to a transfer device an RFID tag according to claim 1, wherein:

when the transfer direction of the transfer device is changed by one hundred and eighty degrees, the holding unit fixes the retaining unit at a position such that the distances to the antenna before and after the change of the transfer direction are the same.

3. The mechanism for attaching to a transfer device an RFID tag according to claim 1, further comprising:

a post member extending from the transfer device; and a wheel member attached to the post member and being directed toward a direction of movement of the transfer device, wherein:

the retaining unit comprises the post member, and the post member rotates in accordance with the direction of rotation of the wheel member.

4. The mechanism for attaching to a transfer device an RFID tag according to claim 1, wherein:

the holding unit holds the retaining unit in such a manner that a surface of the RFID tag from which data can be read highly accurately is parallel to the antenna for the reader/writer provided in an orientation parallel to a floor.

5. A transfer device using an RFID tag for transmitting and receiving data to and from an RFID reader or writer, comprising:

a placing unit to place a transferred object;

a movement unit to move the placing-unit along a transfer rail;

a retaining unit to retain the RFID tag; and a holding unit to hold the retaining unit in such a manner that a surface of the RFID tag from which data can be read highly accurately faces an antenna of the RFID reader or writer while keeping a distance between the RFID tag and the antenna within a certain range regardless of a transfer direction of the transfer device, the holding unit including a rotation member, the rotation member rotating the retaining unit in accordance with and when a chance in the transfer direction occurs, a projection member provided on the periphery of the rotation member and projects toward the center of the rotation member; and an elastic member provided away from the rotation member and pushing the projection member, wherein:

when the retaining unit is rotated by the rotation member, the projection member escapes to a space away from the rotation member while applying a force to the elastic member, and when the retaining unit passes through, said projection member returns to an original position by being pushed by an elastic force of the elastic member.

6. A transfer system using an RFID tag for transmitting and receiving data to and from an RFID reader or writer, comprising:

a transfer device including the RFID tag and transferring a transferred object;

a transfer rail to transfer the transfer device; and an RFID reader or writer to perform communications with the RFID tag, wherein:

the transfer device comprises:

a placing unit to place the transferred object;

a movement unit to move the placing unit along a transfer rail;

a retaining unit to retain the RFID tag; and a holding unit to hold the retaining unit in such a manner that a surface of the RFID tag from which data can be read highly accurately faces an antenna for the RFID reader or writer while keeping a distance between the RFID tag and the antenna within a certain range regardless of a transfer direction of the transfer device, the holding unit including a rotation member, the rotation member rotating the retaining unit in accordance with the change in the transfer direction when the transfer direction of the transfer device is changed, a projection member provided on the periphery of the rotation member and projects toward the center of the rotation member; and an elastic member provided away from the rotation member and pushing the projection member, wherein:

when the retaining unit is rotated by the rotation member, the projection member escapes to a space away from the rotation member while applying a force to the elastic member, and when the retaining unit passes through, said projection member returns to an original position by being pushed by an elastic force of the elastic member.

* * * * *

UNITED STATES PATENT AND TRADEMARK OFFICE

CERTIFICATE OF CORRECTION

PATENT NO. : 7,661,598 B2
APPLICATION NO. : 11/864746
DATED : February 16, 2010
INVENTOR(S) : Yoshitaka Muraoka et al.

It is certified that error appears in the above-identified patent and that said Letters Patent is hereby corrected as shown below:

Column 11, Line 12, change “chance” to --change--.

Signed and Sealed this

Fourth Day of May, 2010

David J. Kappos
*Director of the United States Patent and Trademark Office*